Figure 4:
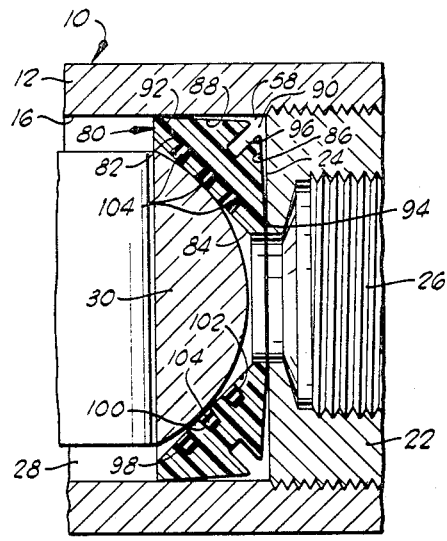

Oct. 29, 1968  D. SCARAMUCCI  3,408,038
FLEXIBLE VALVE SEAT
Filed Aug. 25, 1966  2 Sheets-Sheet 1
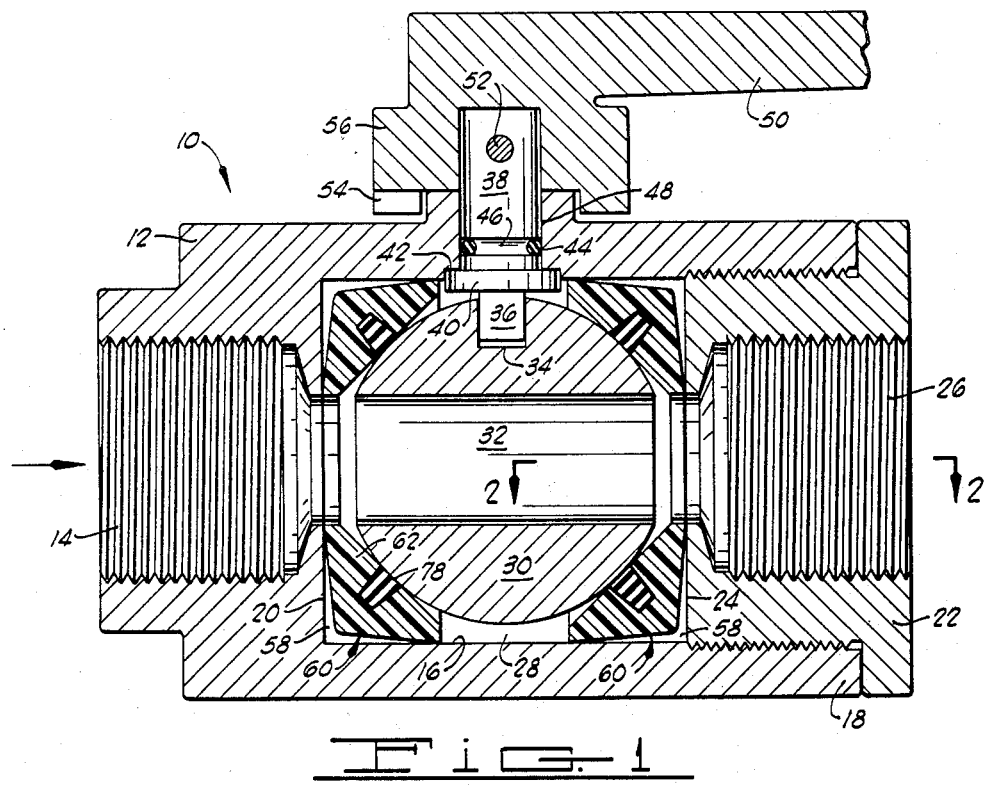
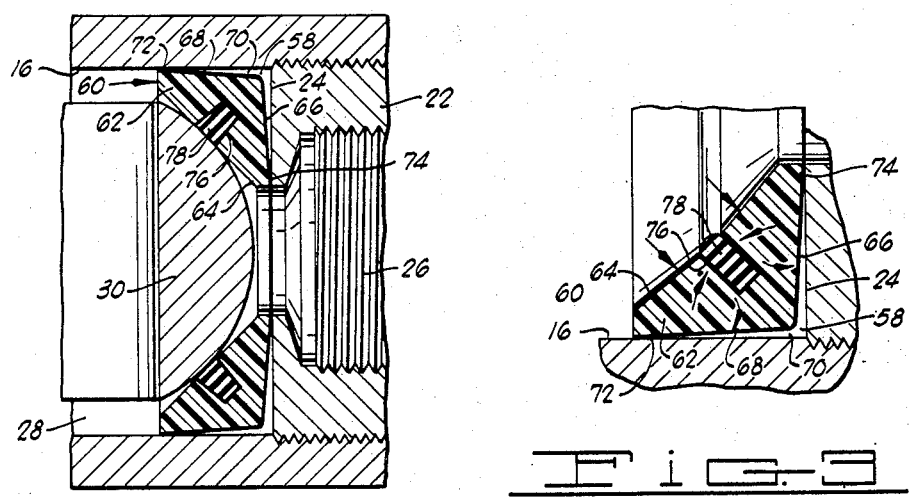
INVENTOR.
DOMER SCARAMUCCI
BY
Dunlap and Laney
ATTORNEYS Oct. 29, 1968  D. SCARAMUCCI  3,408,038
FLEXIBLE VALVE SEAT Filed Aug. 25, 1966  2 Sheets-Sheet 2

INVENTOR.
DOMER SCARAMUCCI

BY
Dunlap and Laney
ATTORNEYS

United States Patent Office 3,408,038
Patented Oct. 29, 1968

3,408,038
FLEXIBLE VALVE SEAT
Domer Scaramucci, Oklahoma City, Okla., assignor to Balon Corporation, Oklahoma City, Okla., a corporation of Oklahoma
Filed Aug. 25, 1966, Ser. No. 575,077
23 Claims. (Cl. 251—175)

This invention relates generally to improvements in valves, and more particularly, but not by way of limitation, to an improved valve seat particularly suited for use in ball valves. Related subject matter is disclosed and claimed in my application Serial No. 417,111, filed December 9, 1964 now Patent No. 3,347,517, entitled "Valve and Seal," and my application Serial No. 275,025, entitled "Valve Seat with Backing," filed on even date herewith.

As it is well known in the art, valve seats normally employ a sealing ring to sealingly engage the valve member in an effort to prevent the flow of fluid through the valve when the valve member is in a closed position. Such sealing rings may be characterized as either relatively soft or relatively hard. The softer sealing rings are normally employed in low pressure service, since such materials are subject to being extruded, but some of the softer sealing rings have been employed in relatively high pressure service when they can be arranged to be trapped in a sealing position. The usual way of supporting a relatively soft sealing ring where it will be trapped in a sealing position is to provide a metallic reinforcing ring which will be engaged by the valve member when the valve member is in a closed position to prevent extrusion of the sealing ring. The softer sealing rings are normally formed of a natural or synthetic rubber compound.

The harder sealing rings referred to above are normally formed of what is commonly known as a plastic material, such as Teflon or nylon, and such sealing rings will normally comprise an entire valve seat. In other words, the harder sealing rings normally perform the dual functions of supporting the valve member in the desired position and making a seal with the valve member. The harder material sealing rings efficiently perform the function of supporting the valve member in the desired position, but difficulty is experienced in shaping such sealing rings to effectively and efficiently perform the sealing function, particularly in lower pressure service. These harder material sealing rings are normally formed with one or more relatively flexible sealing lips, and it is difficult to provide such sealing lips where they will provide an effective low pressure seal and yet not be damaged during repeated opening and closing movements of the valve member.

At least one effort has been made to combine a soft sealing ring with a hard sealing ring, but to the best of my knowledge such a combination has not been effectively employed prior to my invention.

In its broader aspects, the present invention contemplates a valve seat comprising an elastic material bearing ring shaped to be flexed or distorted by a valve member in a direction to reduce the volume of a circumferential groove provided in the seating surface of the bearing ring. A sealing ring of a lower modulus of elasticity is secured in the circumferential groove, and preferably completely fills such groove, such that the sealing ring is partially extruded, or is placed under compressional forces tending to extrude the sealing ring from the groove, to provide a more positive sealing engagement between the sealing ring and the valve member, such that the soft sealing ring may be positioned where it will not be damaged by repeated opening and closing movements of the valve member and yet will be effective to provide a seal with the valve member, even under relatively low pressure service conditions.

An object of the invention is to provide a valve seat which may be easily molded and which will require no machining.

Another object of the invention is to provide a valve seat which efficiently and effectively performs the dual functions of supporting a valve member in the desired position and providing a seal with the valve member.

A further object of the invention is to provide a valve seat employing a relatively soft sealing ring which will not be damaged through a substantial period of service and yet will be effective to seal against a valve member.

A still further object of the invention is to provide a valve which may be used in either high or low pressure service; which may be economically manufactured, and which will have a long service life.

Other objects and advantages of the invention will be evident from the following detailed description when read in conjunction with the accompanying drawings which illustrate the invention.

Figure 5:
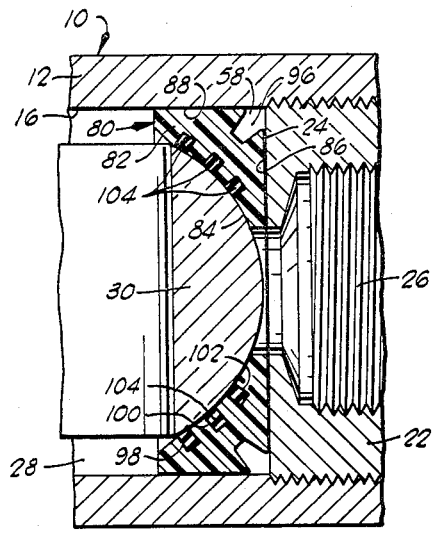
Figure 6:
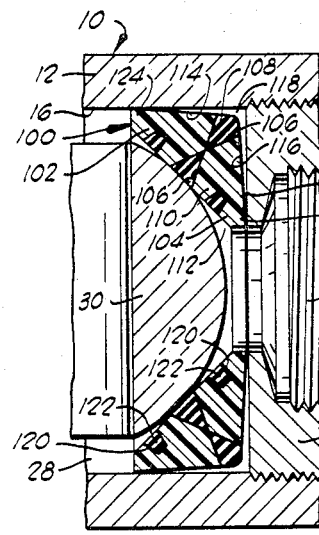
Figure 7:
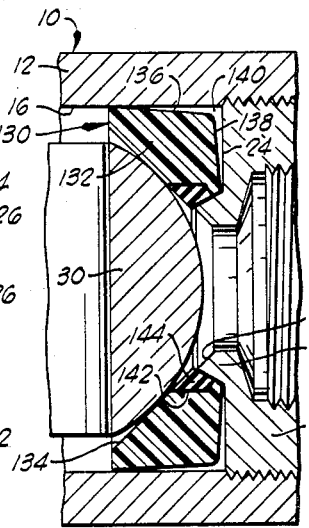
Figure 8:
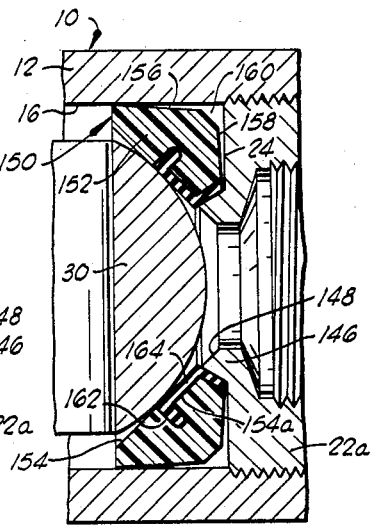

In the drawings:
FIG. 1 is a vertical sectional view through a ball valve constructed in accordance with this invention.
FIG. 2 is a partial sectional view taken substantially along lines 2—2 of FIG. 1.
FIG. 3 is a schematic cross sectional illustration of a valve seat and cooperating parts of a valve body of the type shown in FIGS. 1 and 2, illustrating the actions of the valve seat under operating conditions.
FIG. 4 is a view similar to FIG. 2 illustrating a modified valve seat.
FIG. 5 is an illustration of the valve seat of FIG. 4 when the valve member is moved downstream by fluid pressure.
FIGS. 6, 7, and 8 are additional views similar to FIG. 2 showing still further embodiments of valve seats constructed in accordance with this invention.

Referring in the drawings in detail, and particularly FIG. 1, reference character 10 generally designates a ball valve constructed in accordance with this invention. The valve 10 includes a valve body 12 having a threaded inlet 14 in one end thereof and a larger counter-bore 16 extending from the opposite end 18 thereof to provide a shoulder or wall 20 at the intersection of the inlet 14 and counterbore 16 which extends substantially normal to the axis of the inlet 14. A connector 22 is threadedly secured in the end 18 of the valve body 12 and has a flat inner end 24 forming a shoulder or wall which also extends substantially normal to the axis of the inlet 14. A threaded outlet 26 is formed through the center of the connector 22 in alignment with the inlet 14, such that the valve 10 may be secured in a fluid circuit. It will also be understood that rather than having the inlet 14 and outlet 26 threaded for connection with adjacent sections of a pipeline, the valve 10 could be secured in the fluid circuit by other mechanisms, such as flanges or union-type connectors.

The counterbore 16, between the end walls 20 and 24, forms a valve chamber 28 for a valve ball 30. The ball 30 has the usual port 32 therethrough which is aligned with the inlet 14 and outlet 26 when the valve is in an open position as illustrated in FIG. 1 and which is extended in a direction normal to the axis of the inlet 14 and outlet 26 when the valve is in a closed position as illustrated, for example, in FIG. 2.

As shown in FIG. 1, the ball 30 is provided with a rectangular slot 34 in the top thereof to receive the lower end 36 of a valve stem 38 by means of which the ball 30 is turned between its open and closed positions. The end 36 of the valve stem 38 is rectangular in cross section and the slot 34 is elongated, such that the ball 30 may be moved upstream and downstream in the valve chamber 28 when in a closed position, as is normal in many ball valve constructions. A circumferential flange 40 is formed around the valve stem 38 immediately above the lower rectangular end 36 to engage a flat surface 42 provided in the top of the valve chamber 28 and prevent the inadvertent removal of the valve stem 38 from the valve body 12 during operation. A sealing ring 44 is disposed in a circumferential groove 46 formed around the valve stem 38 to seal with the walls of the aperture 48 formed in the valve body 12 receiving the valve stem. A suitable handle 50 is secured on the upper or outer end of the valve stem 38 by a pin or the like 52 for manually turning the valve stem 38 and valve ball 30. A projection 54 is formed on the lower end of the hub 56 of the handle 50 to engage valve stops (not shown) formed on the valve body 12 and limit the turning movement of the ball 30 to substantially ninety degrees between its open and closed positions as is common in the art.

The walls of the counterbore 16 adjacent the opposite ends of the valve chamber 28, and the end walls 20 and 24, form what may be considered sockets 58 for receiving the valve seats generally designated by the reference character 60. As shown in FIG. 1, two of the valve seats 60 are shown, one for each of the upstream and downstream ends of the valve chamber 28, such that the valve 10 may be used in either direction in the fluid circuit. That is, what has been designated as the inlet 14 may be either the inlet or the outlet of the valve.

As shown and designated more in detail in FIG. 2, each valve seat 60 comprises a bearing ring 62 of generally triangular cross section having a tapered seating surface 64 facing the valve ball 30, an end face 66, and an outer periphery 68. The outer periphery 68 and end face 66 of the bearing ring 62 intersect at an angle greater than the angle between the walls of the counterbore 16 and the respective end wall 24 when the bearing ring is in a relatively relaxed position as shown in FIG. 2 to provide what is designated herein as an expansion chamber 70. Thus, when the bearing ring 62 is in a relaxed position in the respective socket 58, the end portion 72 of the outer periphrey 68 opposite to the end face 66, and the end portion 74 of the end face 66 opposite to the outer periphrey 68, form annular supporting areas for the bearing ring 62 and support the bearing ring in such a manner to provide the expansion chamber 70.

The bearing ring 62 is formed of an elastic material having good bearing qualities so as not to be damaged by repeated engagement with the valve ball 30, but yet which will be sufficiently flexible to be flexed or distorted into the expansion chamber 70 when force is imposed thereon by the valve ball 30, as will be set forth more fully below. The bearing ring 62 preferably formed of what are commonly known as plastic materials, such as nylon or Teflon and, if desired, may be reinforced, as with fiberglass.

A circumferential groove 76 is formed in the seating surface 64 facing the valve ball 30, and preferably in the central portion of the seating surface 64. An elastic material sealing ring 78 is positioned (as bonded) in the groove 76 and preferably completely fills the groove 76 when the bearing ring 62 is in a relaxed condition, such that the exposed surface of the sealing ring 78 is coterminous with the seating surface 64. The sealing ring 78 is what may be characterized as a relatively soft material and has a lower modulus of elasticity than the material comprising the bearing ring 62. For example, the sealing ring 78 may be formed of a natural or synthetic rubber composition when the bearing ring is formed of nylon or Teflon, or the sealing ring 78 may be formed of Teflon when the bearing ring 62 is formed of a harder plastic-type material, such as nylon, reinforced with fiberglass.

Operation of FIGS. 1–3 embodiment

When the valve ball 30 is in an open position as shown in FIG. 1 it is centered in the valve chamber 28. In this position of the ball 30, the ball engages the central portion of the seating surface 64 of each of the valve seats 60 and the sealing rings 78 when the exposed surfaces of the sealing rings are coterminous with the seating surfaces 64. It may also be noted that in this centered position of the ball 30, the bearing ring 62 of each valve seat is held slightly compressed against the walls of the counterbore 16 and the respective end wall 20 or 24.

When the valve ball 30 is turned to a closed position as shown in FIG. 2 and the inlet or upstream pressure is relatively low, the valve ball 30 will remain substantially centered in the valve chamber 28, but will have sufficient engagement with the downstream valve seat 60 to provide a seal between the ball 30 and both the bearing ring 62 and sealing ring 78 of the downstream valve seat to prevent the leakage of fluid into the outlet 26. When the valve ball 30 is substantially centered in the valve chamber 28, the upstream valve seat 60 may also be effective to prevent the leakage of fluid into the valve chamber 28, but the downstream seat 60 is the seal primarily relied upon.

When the valve ball 30 is moved to a closed position and substantial pressure exists in the inlet 14, the pressure differential across the ball forces the ball downstream toward the outlet 26. The ball 30 therefore also distorts or flexes the central portion of the bearing ring 62 until, if the pressure is high enough, the end face 66 of the bearing ring fully engages the end wall 24, and the outer periphery 68 of the bearing ring fully engages the walls of the counter bore 16. As schematically illustrated in FIG. 3, such distortion or flexing of the bearing ring 62 creates forces in the bearing ring tending to reduce the volume of the circumferential groove 76. Since the sealing ring 78 has a lower modulus of elasticity than the bearing ring 62, these forces tend to cause an extrusion of the sealing ring 78 out of the groove 76 toward the valve ball 30. As a result, the sealing engagement of the sealing ring 78 with the adjacent surface of the ball 30 is substantially augmented or enhanced to further assure that leakage of fluid between the ball 30 and the downstream valve seat 60 will be effectively prevented. The bearing ring 62 of the downstream valve seat 60 will effectively support the ball 30 without damage to the bearing ring, either by crushing or by extrusion of the material of the bearing ring between the ball and either the end wall 24 or the walls of the counterbore 16. As previously noted, the material of the bearing ring 62 may be reinforced with fiberglass or the like if necessary or desired, as in extremely high pressure service.

Embodiment of FIGS. 4 and 5

A modified valve seat construction 80 for use in the valve 10 is illustrated in FIG. 4 in its substantially relaxed condition. The valve seat 80 comprises a bearing ring 82 of generally triangular shape in cross section having a tapered seating surface 84 facing the valve ball 30; an end face 86 facing the valve chamber or socket end wall 24, and an outer periphery 88 facing the walls of the counterbore 16. Here again, the end face 86 of the bearing ring intersects the outer periphery 88 at a larger angle than the angle between the end wall 24 and walls of the counterbore 16 to provide an expansion chamber 90 around the central portion of the bearing ring opposite to the seating surface 84. The end portion 92 of the outer periphery 88 opposite the end face 86 provides an annular supporting area in engagement with the walls of the counterbore 16, and the outer end portion 94 of the end face 86 opposite to the outer periphery 88 provides an annular supporting area engaging the end wall 24 when the bearing ring 80 is in a substantially relaxed condition. Further, a circumferential groove 96 is provided in the bearing ring 82 at the intersection of the end face 86 and outer periphery 88 to increase the flexibility of the bearing ring, as will be further described.

Three circumferentially extending grooves 98, 100, and 102 are formed in the seating surface 84 of the bearing ring. The groove 100 is in the central portion of the seating surface 84 and the grooves 98 and 102 are arranged on opposite sides of the groove 100 but sufficiently close to the groove 100 to be covered by the valve ball 30 when the valve ball is moved downstream the maximum extent, as will be further described. A sealing ring 104 is disposed in each of the grooves 98, 100, and 102, and is preferably of a size to completely fill the respective groove, such that the exposed face of the respective sealing ring is coterminous with the seating surface 84 of the bearing ring 82. The sealing rings 104 are formed of a softer material having a lower modulus of elasticity than the material of the bearing ring 82 in the same relationship between the sealing ring and bearing ring discussed above in connection with FIGS. 1–3.

When the ball 30 is substantially centered in the valve chamber 28 as illustrated in FIG. 4, the ball 30 contacts only the central portion of the seating surface 84 to only slightly compress the bearing ring 82 and maintain the seal between the surface of the ball 30 and both the central sealing ring 104 and the central portion of the seating area 84. When the valve ball 30 is in a closed position and substantial pressure is developed in the inlet of the valve, the ball 30 will be moved downstream as illustrated in FIG. 5. The ball 30 will therefore flex or distort the central portion of the bearing ring 82 until the outer periphery 88 of the bearing ring fully engages the wall of the counterbore 16, and the end face 86 of the bearing ring fully engages the end wall 24. With such distortion of the bearing ring 82, forces are developed in the bearing ring tending to reduce the volume of each of the grooves 98, 100, and 102, which, in turn, tends to extrude the sealing rings 104 toward the ball 30. The sealing engagement of the sealing rings 104 with the surface of the ball 30 is therefore enhanced or augmented in the same manner as previously described in connection with FIGS. 1–3. It should also be noted that the groove 96 in the bearing ring 82 increases the flexibility of the central portion of the bearing ring and becomes enlarged as the outer periphery 88 and end face 86 are brought into full engagement with the respective walls of the respective socket 58.

In the foregoing discussion of FIGS. 4 and 5, only a downstream valve seat 80 has been described. It will be understood, however, that either a valve seat 80 or another suitable type of valve seat will be installed on the upstream side of the valve ball 30, such that the valve may be used with either end thereof being the inlet in the same manner as discussed above.

*Embodiment of FIG. 6*

Another form of valve seat construction 100 is illustrated in FIG. 6. In this form of the invention the bearing ring is formed in two sections 102 and 104 placed end to end. The central portions of the adjacent ends of the sections 102 and 104 are substantially in contact, and then each such end is tapered away from the opposite section to form a pair of substantially V-shaped spaces 106 which are filled with an elastic material 108 having a lower modulus of elasticity than the material of the sections 102 and 104. The elastic material 108 is bonded to the adjacent ends of the sections 102 and 104 to provide a complete bearing ring 110 of generally triangular shape in cross section relatively flexible through its central portion. It will also be noted that the sections 102 and 104 are shaped to provide a seating surface 112 which is tapered and facing the valve ball 30; an outer periphery 114, and an end face 116. The outer periphery 114 and end face 116 of the completed bearing ring 110 converge at an angle greater than the angle between the end wall 24 and walls of the counterbore 16, when the bearing ring is in a substantially relaxed position as shown in FIG. 6, to provide an expansion chamber 118 in the manner previously described with the above mentioned embodiments.

Each of the sections 102 and 104 of the bearing ring 110 is provided with a circumferential groove 120 in the seating surface 112 thereof, and each of such grooves is filled with a sealing ring 122. The sealing rings 122 may be of the same material as the elastic material 108, but in any event, has a lower modulus of elasticity than the material of the bearing ring sections 102 and 104.

When the valve ball 30 shown in FIG. 6 is in a closed position and is forced downstream toward the outlet 26 by a pressure differential, the force imposed on the seating surface 112 tends to pivot the bearing ring section 102 about its end 124, and the bearing ring section 104 about its inner end 126, until the bearing ring section 102 engages the walls of the counterbore 16 and the end face 116 of the bearing ring section 104 engages the end wall 24, As a result of such pivoting movements, the V-shaped groove 106 facing the valve ball 30 will tend to be reduced in volume to tend to extrude the elastic material 108 into tighter sealing engagement with the adjacent surface of the ball 30. Further, the widths of the circumferential grooves 120 will tend to be reduced, which will also tend to extrude the sealing rings 122 into a tight, sealing engagement with the adjacent surfaces of the ball 30.

*Embodiment of FIG. 7*

Another embodiment of the valve seat construction 130 and slightly modified valve body connector 22a are illustrated in FIG. 7. The valve seat 130 comprises a bearing ring 132 of an elastic material of the same type as employed in the bearing rings previously described. The bearing ring 132 has a tapered seating surface 134 facing the valve ball 30; an outer periphery 136 and an end face 138. The outer periphery 136 and end face 138 are shaped with respect to the walls of the counterbore 16 and the end wall 24 of the connector 22a in a manner similar to that previously described in order to provide an expansion chamber 140 around the central portion of the bearing ring.

A groove 142 is formed in the bearing ring 132 between the tapered seating surface 134 and the inner periphery of the bearing ring to receive an elastic material sealing ring 144 of the same type of material as the previously described sealing rings.

The modified connector 22a is provided with a circumferential shoulder 146 extending axially into the valve chamber through the inner periphery of the valve seat 130. The inner end 148 of the shoulder 146 is shaped to mate with the valve ball 30 and terminates outwardly of the end of the sealing ring 144 facing the valve ball 30.

In operation of the FIG. 7 embodiment, the valve ball forces the bearing ring 132 to be deflected or distorted into the expansion chamber 140 substantially in the same manner as previously described. Upon such distortion of the bearing ring 132, the sealing ring 144 tends to be extruded from between the walls of groove 142 and the adjacent wall of the shoulder 146 into tight sealing engagement with the adjacent surface of the ball 30. The seating surface 148 of the shoulder 146 is positioned so as not to be engaged by the ball 30 as long as the valve seat 130 is intact. However, in the event of the destruction of the valve seat 130, as by a fire, the ball 30 would move on downstream into engagement with the surface 148, such that the surface 148 would provide a secondary seal and continue to minimize leak-

Embodiment of FIG. 8

The modified valve seat 150 illustrated in FIG. 8 is also designed for use with the modified valve body connector 22a. The valve seat 150 comprises a bearing ring 152 formed of an elastic material of the same type as employed in the bearing rings previously described. The bearing ring 154 is provided with a tapered seating surface 154 facing the valve ball 30; an outer periphery 156 and an end face 158. The outer periphery 156 and end face 158 are arranged with respect to the walls of the counterbore 16 and the end wall 24 in a manner similar to that previously described to provide an expansion chamber 160 around the central portion of the bearing ring to receive the bearing ring upon distortion of the bearing ring.

A circumferential groove 162 is formed in the central portion of the seating surface 154 of the bearing ring 152. The portion 154a of the seating surface 154 inwardly of the groove 162 is spaced further from the ball 30 than the remaining portion of the seating surface 154 to receive a sheet of sealing material 164 and position the exposed face of the material 164 substantially coterminous with the outer portion of the seating surface 154. The elastic material 164 extends into the groove 162 and over the inner periphery of the bearing ring 152. It will be understood that the elastic material 164 is bonded to the bearing ring 152 to provide a completed valve seat 150.

When the bearing ring 152 of the valve seat 150 is flexed or distorted outwardly into the expansion chamber 160, the width of the groove 162 tends to be reduced which urges the sealing material 164 into tight sealing engagement with the adjacent surface of the valve ball 30. As in the embodiment of FIG. 7, the seating surface 148 of the shoulder 146 will contact the ball 30 in the event of destruction of the valve seat 150 to provide a secondary seal until the valve seat can be replaced.

From the foregoing it will be apparent that the present invention provides a novel valve and seat therefor which will provide an efficient and effective control of fluid flow. The valve seat will effectively provide the dual functions of supporting the valve member in the desired positions and providing an effective seal with the valve member to prevent the flow of fluid into the outlet of the valve in which the seat is used. The valve seat of this invention is effective in both high and low pressure services, and the higher the pressure being controlled, the tighter will be the seal between the valve member and the seat. It will also be apparent that the valve seat of this invention requires no machining and is economical to produce.

Changes may be made in the combination and arrangement of parts or elements as heretofore set forth in the specification and shown in the drawings, it being understood that changes may be made in the embodiments disclosed without departing from the spirit and scope of the invention as set forth in the following claims.

What is claimed is:

1. A valve, comprising:
   a body having a valve chamber therein, an inlet communicating with the valve chamber and an outlet communicating with the valve chamber;
   a valve member supported in the valve chamber for movement, when in a closed position, toward the outlet of the valve in response to a pressure differential across the valve member; and
   an annular-shaped seat in the valve chamber surrounding the valve outlet, comprising:
   an elastic material bearing ring having a tapered surface facing the valve member and positioned with only a portion thereof contacting the valve member when the valve member is centered in the valve chamber, said bearing ring also having a circumferential groove in said surface facing the valve member; and
   an elastic material seal ring secured in and substantially filling said groove and having a lower modulus of elasticity than said bearing ring;
   said bearing ring and cooperating walls of the valve chamber being shaped for distortion of the bearing ring and extrusion of a portion of said seal ring from said groove into sealing engagement with the valve member when the valve member is moved toward the outlet by fluid pressure.

2. A valve as defined in claim 1 wherein the bearing ring has annular supporting areas thereon remote from the valve member positioned to engage the walls of the valve chamber and space the surface of the bearing ring opposite said groove from the walls of the valve chamber to provide an expansion chamber around a portion of the bearing ring into which the bearing ring is distorted when the valve member is moved toward the outlet of the valve.

3. A valve as defined in claim 1 wherein said groove is located in the portion of said tapered surface in contact with the valve member when the valve member is centered in the valve chamber.

4. A valve as defined in claim 1 wherein said tapered surface contains a plurality of said grooves and seal rings.

5. A valve as defined in claim 1 wherein said tapered surface contains three of said grooves and seal rings, one of said grooves and seal rings being positioned in the portion of said tapered surface in contact with the valve member when the valve member is centered in the valve chamber and the remaining grooves and seal rings are positioned on opposite sides of said one groove and seal ring.

6. A valve as defined in claim 1 wherein said bearing ring is formed out of two ring sections of elastic material bonded together with an elastic material of a lower modulus of elasticity, and said groove is located between said two ring sections.

7. A ball valve, comprising:
   a body having a valve chamber therein, an inlet communicating with the valve chamber, an outlet communicating with the valve chamber, and a seat-receiving socket in the valve chamber surrounding said outlet defined by an annular end wall extending substantially normal to the axis of said outlet and a substantially cylindrical outer wall projecting from the end wall;
   a valve ball supported in the valve chamber for movement, when in a closed position, toward the outlet of the valve in response to a pressure differential across the ball; and
   an annular shaped seat in said socket, comprising:
   an elastic material bearing ring of generally triangular cross section having an end face and a generally cylindrical outer periphery merging at an angle greater than the angle between said socket end and outer walls to form an expansion chamber between at least a portion of said socket end and outer walls and said bearing ring outer periphery and end face when the bearing ring is positioned in the socket in a relaxed condition, said bearing ring having a tapered surface facing the valve ball and being sized to provide contact only between the central portion of said tapered surface and the valve ball when the valve ball is in a central position in the valve chamber, said bearing ring also having a circumferential groove in said tapered surface and being distortable into said expansion chamber by the valve ball when the valve ball is moved toward the valve outlet, thereby reducing the volume of said groove; and
   an elastic material seal ring secured in and substantially filling said groove and having a lower modulus of elasticity than said bearing ring to be partially extruded from said groove when the valve ball is moved toward the valve outlet to sealingly engage the outer surface of the valve ball.

8. A ball valve as defined in claim 7 wherein said groove and sealing ring are located in the center of said tapered surface.

9. A ball valve as defined in claim 7 wherein the end of said seal ring facing the valve ball is coterminus with said tapered surface.

10. A ball valve as defined in claim 7 wherein a plurality of said grooves and seal rings are provided in said tapered surface.

11. A ball valve as defined in claim 7 wherein three of said grooves and seal rings are provided in said tapered surface, one of said grooves and seal rings being positioned in the central portion of said tapered surface and the remaining grooves and seal rings being positioned on opposite sides of said one groove and seal ring.

12. A ball valve as defined in claim 7 wherein the bearing ring has a circumferential relief groove therein facing said expansion chamber to increase the flexibility of the bearing ring.

13. A ball valve as defined in claim 7 wherein the bearing ring comprises two rings of elastic material bonded together with an elastic material of a lower modulus of elasticity.

14. A ball valve as defined in claim 7 wherein said body has a circumferential shoulder thereon encircling the outlet and projecting into the valve chamber at the inner periphery of said socket, said shoulder being terminated in the valve chamber downstream of said tapered surface and shaped to mate with the valve ball in the event of destruction of said seat.

15. A ball valve as defined in claim 14 wherein said seal ring is located adjacent to said shoulder.

16. A ball valve seat, comprising:
an elastic material bearing ring having a valve ball seating surface on one side thereof, an annular seat supporting area adjacent the inner periphery thereof generally opposed to one end of the seating surface, and an annular seat supporting area generally opposed to the opposite end of the seating surface, said bearing ring being flexible in a generally radial direction between said seat supporting areas and having a circumferential groove in said seating area positioned to be varied in width upon flexing of the bearing ring; and
an elastic material sealing ring secured in and substantially filling said groove, and having a lower modulus of elasticity than the bearing ring, whereby said sealing ring is distorted in a direction to be extruded beyond said seating surface when the bearing ring is flexed in a direction to reduce the width of said groove.

17. A ball valve seat as defined in claim 16 wherein a relief groove is formed in said bearing ring between said seat supporting areas and opposed to said seating surface to increase the flexibility of the bearing ring.

18. A ball valve seat as defined in claim 16 wherein said bearing ring is formed in two rings bonded together at the central portion of the bearing ring with an elastic material having a lower modulus of elasticity than said two rings.

19. A ball valve seat as defined in claim 16 wherein said bearing ring is generally triangular in cross section with a substantially vertical face containing one of said supporting areas and a substantially cylindrical outer periphery containing the other of said supporting areas, and with said seating surface being positioned at an angle to the vertical.

20. A ball valve seat as defined in claim 19 wherein said groove and sealing ring are located in the central portion of said seating surface.

21. A ball valve seat as defined in claim 19 wherein a plurality of said grooves and sealing rings are located in said seating surface.

22. A ball valve seat as defined in claim 19 wherein three of said grooves and sealing rings are located in said seating surface, one of said grooves and sealing rings being located in the central portion of said seating surface and the remaining grooves and sealing rings being located on opposite sides of said one groove and sealing ring.

23. A ball valve seat as defined in claim 19 wherein a relief groove is formed in said bearing ring opposed to said seating surface to increase the flexibility of the bearing ring.

References Cited

UNITED STATES PATENTS

| | | | |
|---|---|---|---|
| 3,331,582 | 7/1967 | Ford | 251—317 |
| 3,345,032 | 10/1967 | Rawstron | 251—317 XR |
| 3,347,517 | 10/1967 | Scaramucci | 251—315 |
| 3,357,679 | 12/1967 | Gulick | 251—315 XR |

ALAN COHAN, *Primary Examiner.*

H. W. WEAKLEY, *Assistant Examiner.*